United States Patent [19]
Fangmann

[11] 4,390,309
[45] Jun. 28, 1983

[54] CRADLE PIPE ADAPTOR FOR MAGNETIC DRILL

[75] Inventor: Michael D. Fangmann, Bluegrass, Iowa

[73] Assignee: Jancy Engineering Co., Davenport, Iowa

[21] Appl. No.: 262,539

[22] Filed: May 11, 1981

[51] Int. Cl.[3] .......................... B23B 41/08; B23B 45/14

[52] U.S. Cl. .......................................... 408/76; 248/667; 269/1; 269/902

[58] Field of Search .................... 408/76, 103, 107, 97; 269/8, 1, 2, 902; 248/649, 667, 678; 164/377, 378, 384, 391, 395

[56] References Cited

U.S. PATENT DOCUMENTS

| | | | |
|---|---|---|---|
| Re. 30,519 | 2/1981 | Hougen | 408/76 |
| 2,749,781 | 6/1956 | Herzl | 408/97 |
| 3,762,829 | 10/1973 | Yilmaz | 408/76 |

*Primary Examiner*—Z. R. Bilinsky
*Assistant Examiner*—Daniel Howell
*Attorney, Agent, or Firm*—Robert G. Mentag

[57] ABSTRACT

A cradle type adaptor for a magnet base drill which includes a box having a width slightly smaller than the width of the magnet base of the drill so that it can be assembled to the magnetic base by a clamping action. The box includes a pair of longitudinal sides and a pair of end sides. A front and rear vertically adjustable plate is adjustably mounted on the front and rear sides of the box. The front and rear adjustable plates have a V-slot in the lower ends thereof. The lower end of each of the longitudinal sides of the box is formed at an oblique angle so that the adjustable side plates may be adjustably mounted thereon for mounting the cradle pipe adaptor on a small size diameter pipe.

4 Claims, 5 Drawing Figures

CRADLE PIPE ADAPTOR FOR MAGNETIC DRILL

TECHNICAL FIELD

This invention relates to the magnetic drill art, and more particularly to a cradle adaptor for a magnetic drill for operatively mounting a magnetic drill on curved surfaces, such as convexly shaped support surfaces as pipes and the like.

BACKGROUND ART

It is known in the magnetic drill art to provide accessory support plates for a magnet base drill for mounting a drill on a convexly shaped support surface. An example of such prior art accessory support plates is disclosed in U.S. Pat. No. 4,047,827. A disadvantage of the support plates shown in U.S. Pat. No. 4,047,827 is that they do not have sufficient holding power for mounting a magnet base drill on vertically disposed pipes and the like. A further disadvantage of the last mentioned accessory support plates is that they will only fit certain magnet base drills which have been previously prepared for use with the same.

Further examples of support means for magnet base drills are illustrated in the U.S. Pat. No. 3,791,755, and a French patent No. 896,945 issued in May, 1944 and another French patent No. 1,260,819 issued in March, 1961. The last three mentioned patents are cited as prior art patents in U.S. Pat. No. 4,047,827.

DISCLOSURE OF THE INVENTION

In accordance with the present invention, a cradle pipe adaptor for a magnet base drill is provided which comprises a box which has a width which is made slightly smaller than the width of the magnet base of a magnet drill so that when it is assembled thereto it is clamped by suitable bolts onto the base of the magnetic base drill. A pair of longitudinal side plates are adjustably mounted on the logitudinal sides of the box for vertical adjustment along the outer surface of the box side plates. A front and rear vertically adjustable plate, each having a V-slot formed in the lower end thereof, is adjustably mounted on the outer surface of the box front and rear plates, respectively. When the cradle pipe adaptor of the present invention is clamped onto the base of a magnet base drill and the drill is then mounted on a convex support surface, the cradle pipe adaptor will provide seven lines of magnetic gripping force with the convex magnetic support surface. The lower end of each of the longitudinal side plates is formed at an oblique angle, relative to a vertical plane along the inner face of each of the box side plates. The angle is disposed so as to face outwardly, and the adjustable side plates can each be adjustably mounted on the angularly disposed lower surface of the adjacent box side plate for adjustment inwardly and outwardly for mounting a magnet base drill on a small pipe or other convex magnetic supporting surface. The cradle pipe adaptor of the present invention is adapted for mounting a magnet base drill on small convex surfaces as, for example a 1" pipe. The cradle pipe adaptor of the present invention is adjustable to permit a magnet base drill to be mounted on larger convex magnetic surfaces as, for example, a 40" pipe made from magnetic material.

BEST MODE OF CARRYING OUT THE INVENTION

Figure 1:
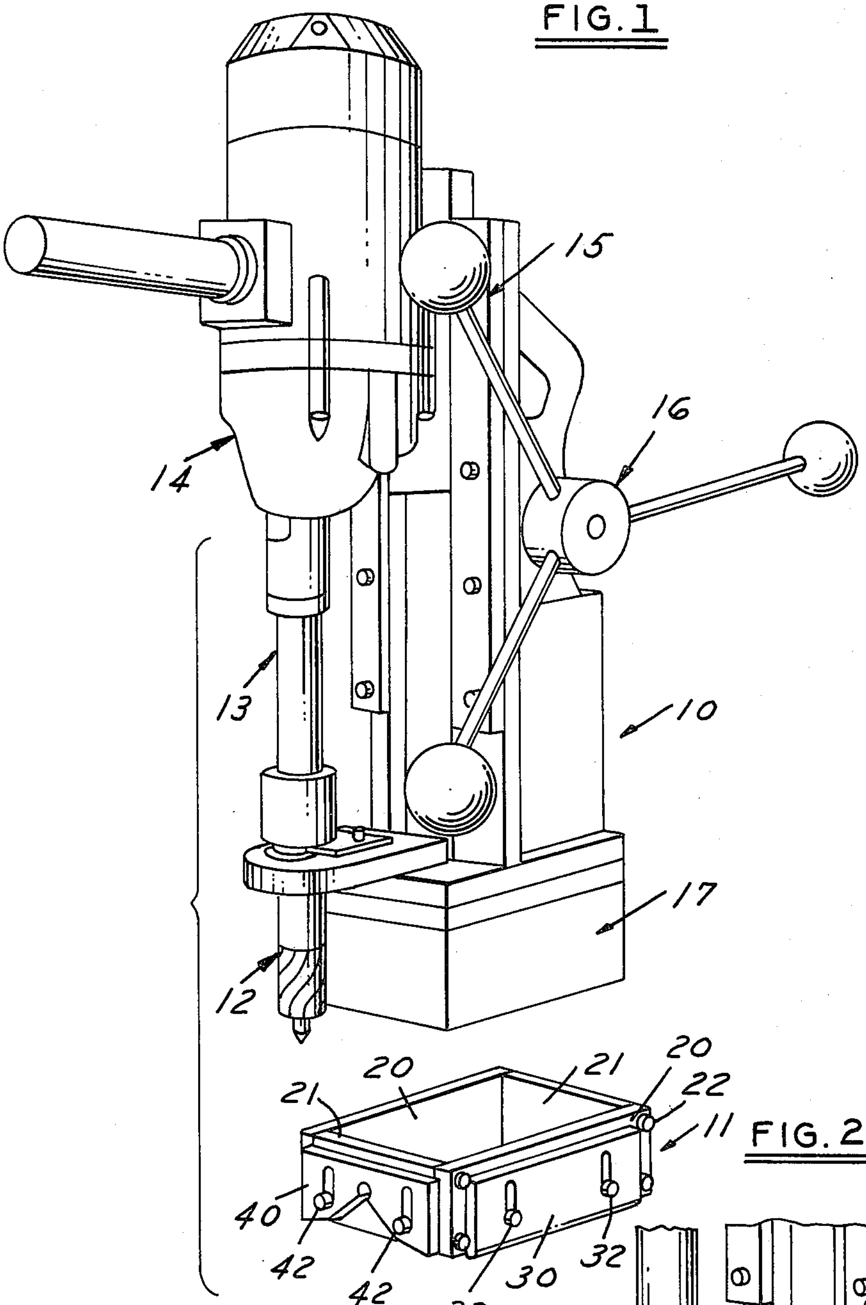
FIG. 1 is an elevation perspective view of a conventional magnet base drill, and showing the same disposed above a cradle pipe adaptor of the present invention, and illustrating the downward movement of the drill into the cradle for mounting the cradle on the drill.

Referring now to the drawings and in particular to FIG. 1, the numeral 10 generally designates a conventional magnet base drill made in accordance with the principles of the present invention. The numeral 11 generally indicates a cradle pipe adaptor made in accordance with the principles of the present invention. The magnet base drill 10 is a conventional drill and various makes of these drills are available on the market. U.S. Pat. No. 4,047,827 illustrates one type of conventional magnet base drill that may be employed with the cradle 11 of the present invention. Another type magnet base drill which may be employed with the cradle 11 of the present invention is one available on the market under the name of "SLUGGER" magnetic drill from the Jancy Engineering Co. of 4525 Buckeye Street, Davenport, Iowa, 52808.

As illustrated in FIG. 1, the magnet base drill 10 generally includes a rotatable center-free drill 12 which is operatively carried by a spindle, generally indicated by the numeral 13, which in turn is rotated by a suitable electric motor, generally indicated by the numeral 14. The motor 14 is movably mounted on a slide means, generally indicated by the numeral 15, which is operated by a suitable gear and rack means by a rotatable handle means 16, for moving the drill 12, spindle 13 and motor 14 upwardly and downwardly. The slide 15 is operatively mounted on a conventional magnet base, generally indicated by the numeral 17.

Figure 3:
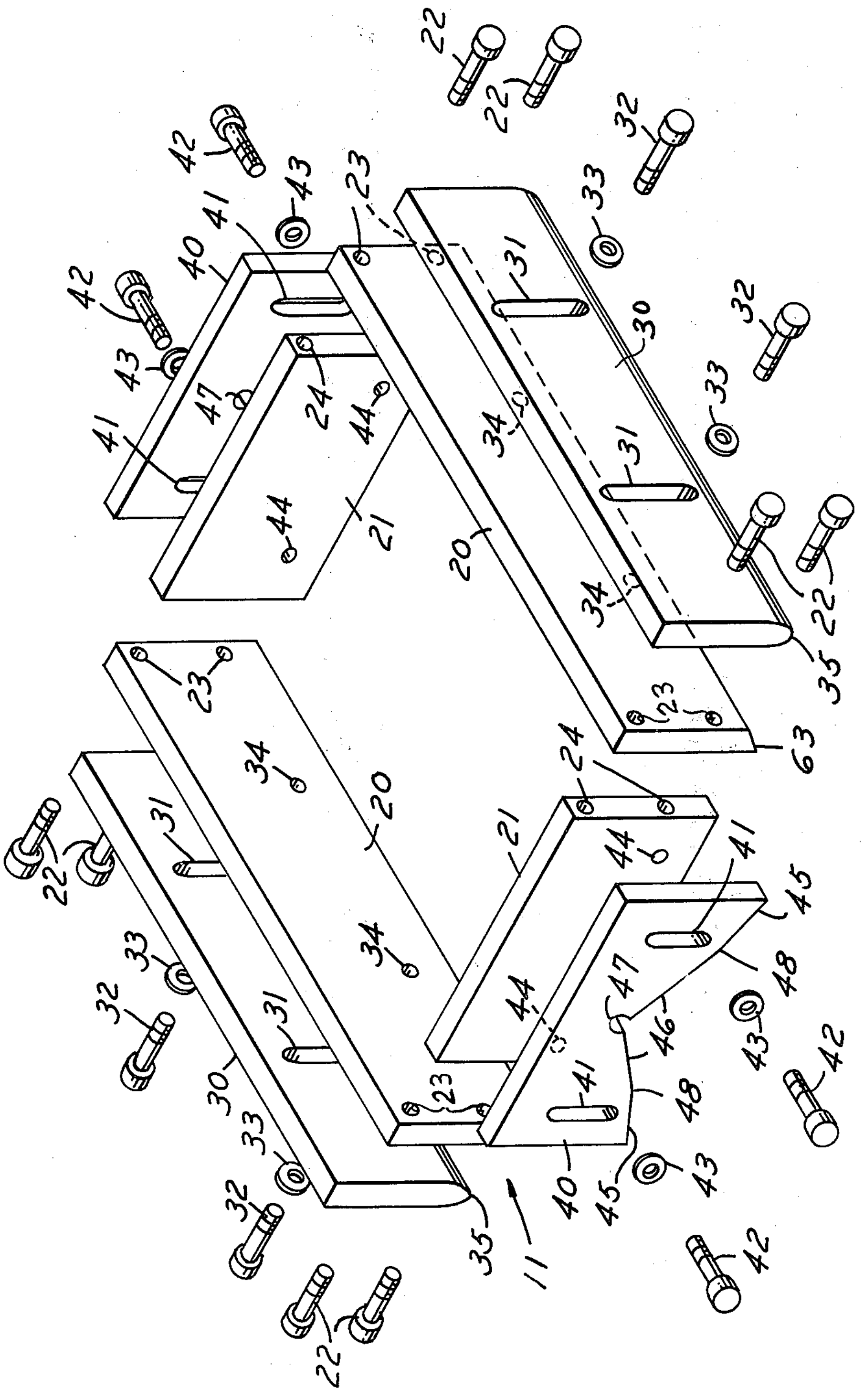
FIG. 3 is a perspective, exploded view of the various parts of the cradle pipe adaptor of the present invention, and showing their operative relationship to each other.

As shown in FIG. 3, the cradle adaptor 11 of the present invention is illustrated as comprising a pair of laterally spaced apart, longitudinally disposed, rectangular, vertical side plates 20 which are interconnected at each end thereof by a transverse, rectangular, vertical end plate 21. The side plates 20 are releasably attached to each end of the end plates 21 by a pair of suitable machine screws 22 which pass through suitable bores 23 formed in the ends of the side plates 20, and into threadable engagement with a pair of vertically spaced apart threaded bores 24. The side plates 20 are initially secured to the end plates 21, and then the base 17 of a magnet base drill 10, as shown in FIG. 1, is then moved downwardly into the box formed by the side plates 20 and the end plates 21. The end plates 21 are formed to a length slightly smaller than the width of the magnet base 17 which is generally of a standard size and, accordingly, when the screws 22 are tightened, the box formed by the side plates 20 and the end plates 21 is securely clamped to the magnet base 17.

The cradle type adaptor 11 of the present invention further includes a pair of rectangular vertically adjustable side plates 30, as shown in FIG. 3. Each of the side plates 30 is provided with a pair of vertically disposed, longitudinally spaced apart slots 31. The plates 30 are each adjustably secured to the adjacent cradle box side plate 20 by a pair of suitable machine screws 32 and washers 33. Each of the machine screws 32 passes through one of the slots 31 and into threadable engagement with a threaded bore 34 formed in the adjacent side plate 20.

Figure 5:
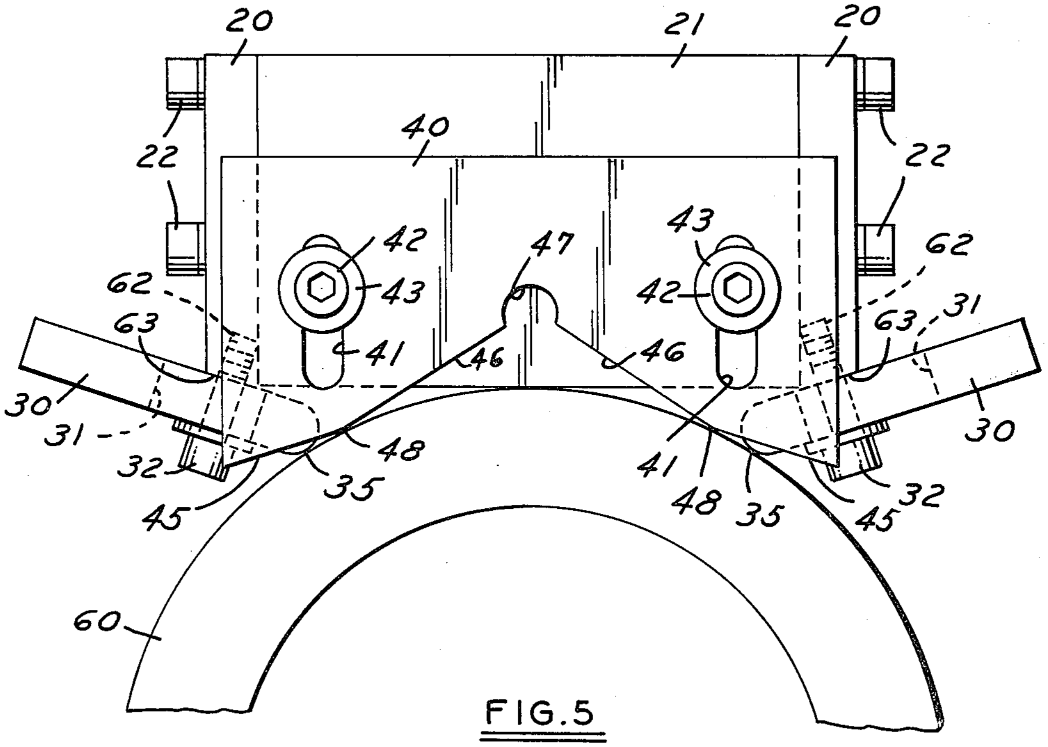
FIG. 5 is a front elevation view of the cradle pipe adaptor structure illustrated in FIG. 4, taken along the line 5—5 thereof, and looking in the direction of the arrows.

The cradle pipe adaptor 11 of the present invention further includes a pair of adjustable, rectangular end plates 40 which are adjustably mounted for vertical sliding movement on the outer faces of each of the end plates 21. Each of the adjustable end plates 40 is provided with a pair of vertical, laterally spaced apart slots 41. Each of the adjustable end plates 40 is releasably secured to the adjacent end plate 21 by a pair of suitable machine screws 42 and washers 43. Each of the machine screws 42 is adapted to pass through one of the slots 41 and into threadable engagement with a threaded bore 44 formed in the adjacent plate 21. As shown in FIGS. 3 and 5, each of the adjustable end plates 40 is provided on the lower end thereof with a substantially V-shaped recess comprising a pair of outer upwardly and inwardly sloping, acute angle, end surfaces 45 which terminate at the lower end of a pair of inwardly and upwardly angled surfaces 46 which are disposed at a larger acute angle from an imaginary horizontal plane across the lower end of each of the adjustable plates 40. Each of the inwardly and upwardly converging surfaces 46 terminate at a circular hole 47.

Figure 2:
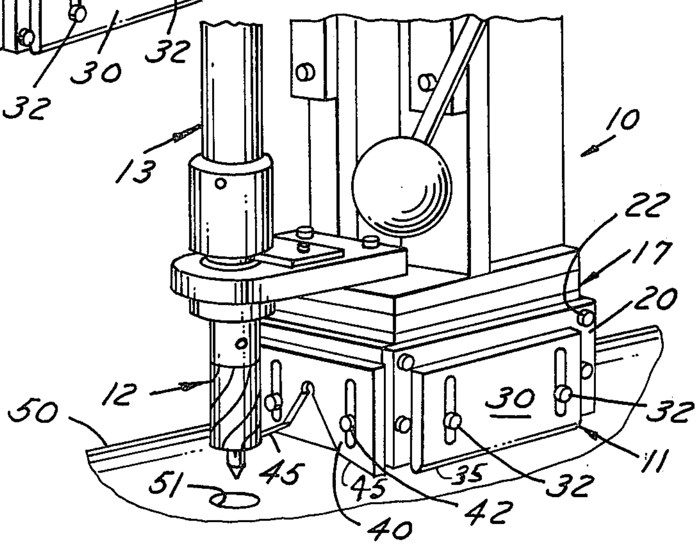
FIG. 2 is a fragmentary, elevation perspective view of the magnet base drill illustrated in FIG. 1, and showing the cradle type adaptor of the present invention mounted on the base of the magnet base drill and operatively mounting the drill on the convex surface of a large diameter pipe.

FIG. 2 shows a conventional magnet base drill 10 mounted on the convex outer surface of a large diameter pipe 50, in which the drill 12 is adapted to bore a hole 51 through the side wall of the pipe 50. The cradle pipe adaptor 11 of the present invention has the side plates 30 adjustably mounted on their adjacent side plates 20 so as to have the lower curved ends 35 in seating engagement on the convex outer surface of the pipe 50. The inwardly and upwardly tapered or converging lower end surfaces 45 on each of the adjustable end plates 40 engage the convex surface of the pipe 50. It will be seen that the cradle pipe adaptor 11 of the present invention provides for seven line contacts with the pipe 50 to provide seven magnetic lines of holding force for holding the drill 10 on the pipe 50. The pipe 50 is made from a magnetic material, and there would be a first line of longitudinal magnetic contact along the center line of the magnet base 17. The line of contact between the lower ends 35 of each of the adjustable side plates 30 form two more lines of magnetic holding contact with the workpiece 50. The lines of contact between the outer convex surface of the pipe 50 and the two points where each of the end plates 40 engage the convex surface of the pipe 50 provide four additional short lines of holding magnetic force. Accordingly, the applicants's cradle pipe adaptor provides for seven lines of magnetic holding forces with the pipe 50 to provide an efficient total holding force for mounting a magnet base drill 10 in an operative position on a pipe as 50, when the pipe is in a horizontal, an angular or vertical position. It will be understood that the adjustable side plates 30 and the adjustable end plates 40 would be adjusted by means of their respective retainer machine screws so that they would be moved downwardly to a workpiece engaging line of contact with an outer convex surface on a magnetic supporting surface.

Figure 4:
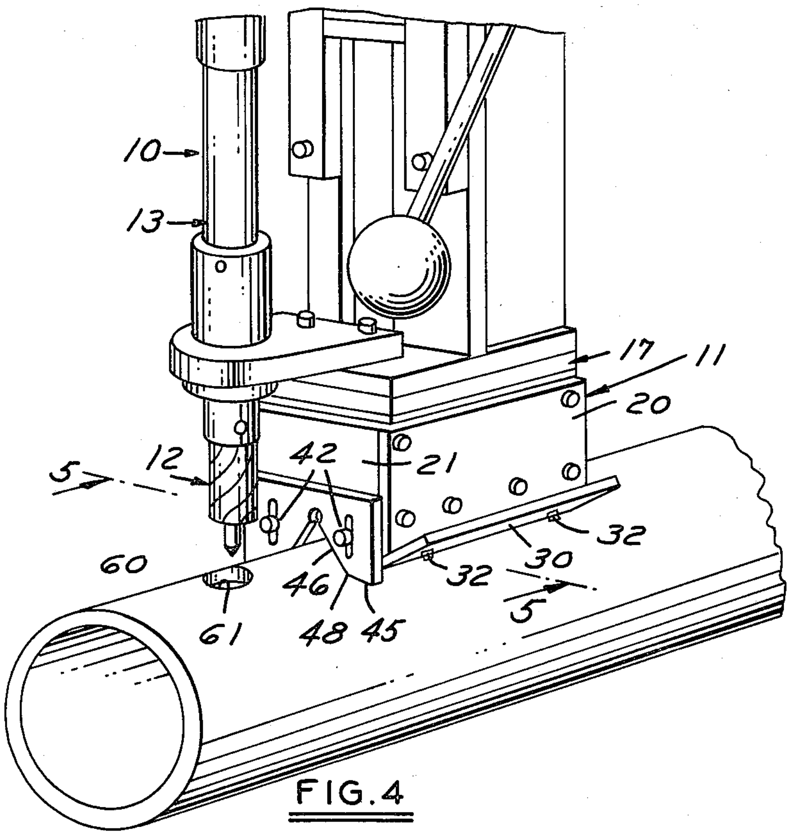
FIG. 4 is a fragmentary, elevation perspective view, similar to FIG. 2, and showing the cradle pipe adaptor of the present invention mounting a magnet base drill on a small size diameter pipe.

FIGS. 4 and 5 show the cradle pipe adaptor 11 of the present invention employed for mounting a magnet base drill 10 on a small size pipe 60 for drilling a hole 61 in the side wall of the pipe 60. When employing the cradle pipe adaptor 11 of the present invention for a small size pipe, the side adjustable pipes 30 are each adjustably mounted on the lower angled face 63 of the cradle box side plates 20. When employed as shown in FIGS. 4 and 5, the adjustable side plates 30 are then adjusted inwardly along the angular surfaces 63 until the lower curved ends 35 engage the outer convex surface of the pipe 60, after which the machine screws 22 are secured in place with their inner ends threadably mounted in the threaded bores 62 formed in the lower end of each of the cradle box side plates 20. It will be seen from FIG. 5 that when the cradle pipe adaptor 11 of the present invention is employed for small size pipe, that the adjustable end plates 40 engage the convex outer surface of such small diameter pipes along a short line contact at the junction point 48 between the angled surfaces 45 and 46. The angled lower end surfaces 63 of the cradle box side plates 20 are formed at an angle of approximately 107° from an imaginary plane along the inner vertical surface of each of the side plates 20.

It will be seen that the cradle pipe adaptor of the present invention is more versatile than the aforedescribed prior art adaptors for magnet base drills since it is capable of functioning quickly, easily and efficiently to mount a magnet base drill on a plurality of different size diameter magnetic workpieces having a convex outer surface in a minimum of time.

INDUSTRIAL APPLICATION

The cradle pipe adaptor of the present invention is used for mounting portable magnet base drill units on the outer convex surface of magnetic materials and workpieces to position the drill for drilling one or more holes into the workpiece, and wherein the workpiece may be a pipe which is horizontally, angularly or vertically disposed.

I claim:

1. A cradle adaptor for use with a portable drill having an electromagnetic base for magnetically adhering the drill to a convex magnetic support surface, and wherein the electromagnetic drill base is rectangularly shaped and includes a flat bottom wall, a pair of opposite parallel side walls and a pair of opposite parallel end walls, characterized in that, said cradle adaptor includes:

(a) a rectangularly shaped box including a pair of laterally spaced side plates and a pair of longitudinally spaced apart end plates which are adapted to be seated against the sides and ends, respectively of the rectangular electromagnetic drill base;

(b) means for releasably securing the side plates of the cradle box to the end plates for clamping the box on said drill base;

(c) a pair of adjustable side plates adjustably mountable on the outer faces of the cradle box side plates by a plurality of bolts extended through slots in the adjustable side plates into threaded engagement with mating threaded holes in the cradle box side plates;

(d) a pair of adjustable end plates adjustably mounted on the outer faces of the cradle box end plates by a plurality of bolts extended through slots in the adjustable end plates into threaded engagement with mating threaded holes in the cradle box end plates; and, (e) means for releasably securing each of the adjustable side plates and the adjustable end plates to the adjacent respective cradle box side plates and cradle box end plates when the drill base is mounted on said convex support surface to have the adjustable side plates and adjustable end plates in magnetic line contact with the convex support surface.

2. The cradle adaptor for mounting a portable drill having an electromagnetic base, as defined in claim 1, characterized in that:

(a) the lower end surface of each of the cradle box side plates is angled and it slopes upwardly and outwardly; and, (b) each of said adjustable side plates is adjustably mountable on the angled lower end surface of the adjacent cradle box side plate by a plurality of bolts extended through slots in the adjustable side plates into threaded engagement with mating holes in the angled lower end surface of said adjacent cradle box side plate, for slidable inward movement until it engages the convex outer surface of a small size diameter convex magnetic support surface.

3. The cradle adaptor for mounting a portable drill having an electromagnetic base, as defined in claim 1, characterized in that:

(a) each of the adjustable end plates is provided with a substantially V-shaped recess in the lower end thereof.

4. The cradle adaptor for mounting a portable drill having an electromagnetic base, as defined in claim 1, characterized in that:

(a) the lower ends of each of the adjustable side plates are rounded.

* * * * *